3,285,827
PROCESS FOR PRODUCING GLUTAMIC ACID
Fred C. Arzberger and Winfred N. McCutchan, both of Terre Haute, Ind., assignors to Commercial Solvents Corporation, a corporation of Maryland
No Drawing. Filed May 28, 1964, Ser. No. 371,100
6 Claims. (Cl. 195—29)

This application is a continuation-in-part of application Serial No. 140,230, filed September 25, 1961, now abandoned.

Our invention relates to a method of producing L-glutamic acid, and more particularly it relates to a method for the production of L-glutamic acid by the fermentation of nutrient fermentation media with the organism *Brevibacterium divaricatum*, nov. sp. NRRL B–2620.

In the past, L-glutamic acid has been produced in a number of ways, the more generally used have included the manufacture of L-glutamic acid either by isolation of hydrolyzed proteins, such as soybean cake and wheat gluten, or by cracking pyrolidone carboxylic acid obtained from Steffens molasses. The yield of L-glutamic acid obtained by such method, however, has been dependent primarily upon the L-glutamic acid content of the particular raw materials used. More recently, the production of L-glutamic acid by fermentation of nutrient media with certain microorganisms including *E. coli, Aerobacter aerogenes, B. subtilis, Cephalesporium acremonium, Micrococcus varians, Micrococcus glutamicus,* etc., has been suggested. The various processes for the production of L-glutamic acid previously available have been subject to various disadvantages from an operating point of view, in view of the fact that some are dependent on the particular character of and L-glutamic acid content of the raw materials used which, in some cases, give low yields of products difficult to recover in satisfactory form. Other processes have required the use of unduly expensive starting materials. Still other processes have suffered from the disadvantage of forming by-products from which L-glutamic acid is not easily and economically recovered. Our new process represents an improvement over previous methods for the production of L-glutamic acid in that good yields of the desired product are produced from readily obtainable and economic starting materials and the L-glutamic acid thus obtained is readily recoverable in a form satisfactory for most purposes.

Our new process for the production of L-glutamic acid depends largely upon the use of a newly discovered microorganism designated as *Brevibacterium divaricatum* nov. sp., a culture of which has been deposited with the Northern Regional Research Laboratories of the U.S. Department of Agriculture under the number NRRL B–2620.

The microorganism *Brevibacterium divaricatum* nov. sp. has been isolated from sewage and from soils obtained from such places as fields, forests, reclaimed ground, and the like. The microorganism was isolated from such sources by suspending 0.1 g. of a sample in 5 ml. of sterilized water which was then cultivated with agar medium made up with a culture medium of the composition shown in Table I below.

TABLE I

| | Percent |
|---|---|
| Glucose | 2.0 |
| $NH_4Cl$ | 0.4 |
| $K_2HPO_4$ | 0.1 |
| $MgSO_4 \cdot 7H_2O$ | 0.05 |
| Hydrolyzed casein | 0.02 |
| $CaCO_3$ | 0.5 |
| Distilled water: tap. | |
| Water (1:1) pH 7.0. | |

The colonies formed after 48 hours' incubation on plates of the above composition at 33–35° C. were transferred to a slant culture medium of the same composition. The colonies formed on the latter were transferred to 5 ml. of liquid culture medium of the composition shown in Table II below and the latter incubated at 33° C. on a reciprocating shaker at a rate of 112 r.p.m.

TABLE II

| | | |
|---|---|---|
| Cerelose | percent | 11.0 |
| Urea | do | 0.2 |
| $MgSO_4 \cdot 7H_2O$ | do | 0.05 |
| $K_2HPO_4$ | do | 0.1 |
| $FeSO_4$ | p.p.m. | 2 |
| $MnSO_4$ | p.p.m. | 2 |
| Desthiobiotin | micrograms/liter | 3.5 |

At the end of 72 hours' incubation, the microorganisms were removed by centrifuging, and the broth was tested by paper chromatography for L-glutamic acid content. Cultures shown to produce L-glutamic acid were then further screened in the same type culture medium to determine quantitive production of L-glutamic acid.

The cultural characteristics whereby *Brevibacterium divaricatum* NRRL B–2620 is identified and distinguished from other microorganisms are as follows:

(1) Microscopic observations: Cells are rods, 1.0 x 2.0 microns occurring singly or in irregular masses. Some pleomorphism is occasionally observed. The organism is non-motile and gram positive.

(2) Gelatin colonies: Compact, brownish yellow; circular. Scanty liquefaction.

(3) Gelatin stab: Scanty liquefaction.

(4) Agar colonies: Growth on Eugon agar after 1–2 days, colonies convex, glistening, entire, cream to brown colored, diameter 2–4 mm.

(5) Agar slant: Abundant growth on Eugon agar after 2 days, yellow-brown, filiform, glistening.

(6) Nutrient broth: Turbid with sediment.

(7) Physiological properties:

(1) Litmus milk: Slight acid production. Soft coagulum is formed.
(2) Indole is not produced.
(3) Nitrite is produced from nitrate.
(4) Methyl red test negative.
(5) Acetylmethylcarbinol not produced.
(6) Aerobic.
(7) Temperature relationships: optimum temperature 33–35° C., minimum 10° C., maximum 42° C.
(8) pH range: optimum 7.0–8.0.
(9) Acid formation from carbohydrates: As shown in Table III below, acid is produced from glucose, fructose, mannose, sucrose, maltose and glycerol.

TABLE III

| Carbohydrate | Acid Production | Gas in Peptone Water |
|---|---|---|
| A. Monosaccharides: | | |
| Glucose | + | − |
| Fructose | + | − |
| Arabinose | − | − |
| Rhamaese | − | − |
| Xylose | − | − |
| Galactose | − | − |
| Mannose | + | − |
| B. Disaccharides: | | |
| Lactose | − | − |
| Sucrose | + | − |
| Maltose | + | − |
| Melibiose | − | − |
| Cellobiose | − | − |
| Trebalose | − | − |
| C. Polysaccharides: | | |
| Raffinese | − | − |
| Melezitose | − | − |
| Starch | − | − |
| Inulin | − | − |
| Dextrin | − | − |
| Glycogen | − | − |
| D. Alcohols: | | |
| Glycerol | + | − |
| Erythritol | − | − |
| Arabitol | − | − |
| Adonitol | − | − |
| Mannitol | − | − |
| Sorbitol | − | − |
| Dulcitol | − | − |
| E. Glucosides: Salicin | − | − |

+ Acid or gas produced.
− Acid or gas is not produced.

Our new process for the production of L-glutamic acid comprises incubating *Brevibacterium divaricatum* NRRL B–2620 in aqueous nutrient media at a temperature preferably between 33° C. and 35° C., under submerged conditions of agitation and aeration. Nutrient media which are useful for this process include a carbohydrate such as sucrose, glucose, fructose, and maltose, or crude sugar-containing materials prepared by hydrolyzing such starch-containing materials as sweet potatoes, potatoes, wheat, corn cassava, and the like, these sugars or sugar-containing materials being used either separately or in mixtures. In addition to carbohydrates, the nutrient media also require the presence of a nitrogen source in either organic or inorganic form, such as urea, ammonium salts such as ammonium chloride, ammonium sulfate and ammonium tartrate, as a source of both inorganic nitrogen and growth promoter or stimulant material such as biotin, desthiobiotin, peptone, meat extracts, corn steep liquor, casin-hydrolysate, wheat-bran-extracts, and the like, can be utilized with desirable results. Biotin and desthiobiotin are preferred growth promoters and advantageously provide L-glutamic acid in significantly improved yields when used with *Brevibacterium divaricatum* NRRL B–2620. The biotin and desthiobiotin are employed in growth promoting amounts and these amounts for biotin are generally from about 1.5 to 3.5 micrograms (μg.) per liter, preferably from about 2 to 3 μg. per liter, and for desthiobiotin are generally from about 2.5 to 7 μg. per liter, preferably from about 4 to 6 μg. per liter. Mineral salts such as magnesium sulfate, dipotassium phosphate, and other trace minerals can also be used with desirable results.

The media are preferably maintained at a pH ranging from 6 to 9 during the fermentation which ordinarily is completed within 1–3 days' time when conducted under aeration-agitation conditions or by shaking.

In the specific examples cited below for purposes of illustrating our new process for the production of L-glutamic acid by means of *Brevibacterium divaricatum*, the L-glutamic acid produced was recovered at the end of the fermentation by removing the mycelia by filtration or centrifuging. The resulting filtrate was then condensed and adjusted to a pH of 3.2 by the addition of acid and the glutamic acid was salted out at reduced temperatures.

If a product of high grade or purity is desired, the condensate is first subjected to ion-exchange resin treatment in order to remove impurities before salting out. After adsorption on the ion-exchange resin, the L-glutamic acid is eluted therefrom and again condensed and then salted out at reduced temperature and recovered by centrifuging and then recrytsallized if desired.

It is understood that the examples given below are for purposes of illustration only and that we are not bound to the specific ingredients or amounts thereof or to the other specific operating conditions other than previously broadly set forth herein.

*Example I*

*Brevibacterium divaricatum* NRRL B–2620 was cultivated for 20 hours at 33° C. in a seed culture medium of the following composition.

| | | |
|---|---|---|
| Cerelose | percent | 4 |
| Urea | do | 0.8 |
| $MgSO_4$ | do | 0.05 |
| $K_2HPO_4$ | do | 0.10 |
| Desthiobiotin | micrograms/liter | 2.5 |

100 ml. of the following medium was then placed in 500 ml. flasks and the contents thereof sterilized for 10 minutes at 115° C.:

| | | |
|---|---|---|
| Cerelose | percent | 11 |
| Urea | do | 0.2 |
| $MgSO_4 \cdot 7H_2O$ | do | 0.05 |
| $K_2HPO_4$ | do | 0.1 |
| $FeSO_4$ | p.p.m | 2 |
| $MnSO_4$ | p.p.m | 2 |
| Desthiobiotin | micrograms/liter | 2.5 |

Each flask was then inoculated with 5 ml. of seed culture prepared as above described and the flask then incubated at 33° C. with shaking, while maintaining an oxygen absorption coefficient of $5.06 \times 10^{-6}$ gram mol of oxygen per ml. per minute. At the end of 24, 28, 36 and 48 hours, 1% of urea was added to the flasks to supply required nitrogen and to maintain the pH neutral or weakly alkalinic.

At the end of 36 hours, the fermenting medium was found to contain 3.5 g. of L-glutamic acid per 100 ml. At the end of 56 hours, the fermented broth was filtered and the filtrate condensed to ⅒ volume and the pH adjusted to 3.2 by the addition of hydrochloric acid. The L-glutamic acid then crystallized out upon cooling to 5° C. from 1 liter of medium fermented as above described, 27.3 g. of crude L-glutamic acid crystals were obtained. After condensation of the filtrate to ¼ volume, 7.6 g. of crude L-glutamic acid crystals were obatined. Upon recrystallization of the two fractions of crude L-glutamic acid, there was obtained 26.9 g. of refined crystals of L-glutamic acid.

*Example II*

The substitution of other sugars, other sources of nitrogen, and other sources of growth stimulants give equally satisfactory results when fermentation media containing same are fermented by *Brevibacterium divaricatum* NRRL B–2620, from 20 to 40% of the carbohydrate consumed being converted into L-glutamic acid.

To show the surprising results provided when using *Brevibacterium divaricatum* NRRL B–2620 with biotin or desthiobiotin as growth promoters, tests conducted comparing the L-glutamic acid production obtained by fermentation employing various strains of the organism *Brevibacterium divaricatum* as follows:

Standard cerelose fermentation media containing as a growth stimulant material either desthiobiotin or biotin were fermented in flasks employing the following strains of *Brevibacterium divaricatum*.

Y(+2) (NRRL B–2311), Y(−) (NRRL B–2312) and Y(+) 3–19 (NRRL B–2620): The flasks were incubated at 30° C., for 48 hours at 385 r.p.m. on rotary shakers. The results were as follows:

| Fermentation Media Containing— | Gms./Liter of Glutamic Acid at 48 hrs. | | |
|---|---|---|---|
| | B-2311 | B-2312 | B-2620 |
| 2.5 µg./l. D,L-desthiobiotin | 15.0 | 15.0 | 19.0 |
| 5.0 µg./l. D,L-desthiobiotin | 14.0 | 27.0 | 40.6 |
| 2.5 µg./l. L-biotin | 39.5 | 18.5 | 46.3 |

The data demonstrates that regardless of the type and amount of growth stimulant material present in the fermentation media, the *Brevibacterium divaricatum* NRRL B-2620 provides better yields of L-glutamic acid than either *Brevibacterium divaricatum* NRRL B-2311 or NRRL B-2312.

Now having described our invention, what we claim is:

1. A process for production of L-glutamic acid which comprises cultivating *Brevibacterium divaricatum* NRRL B-2620 in an aqueous nutrient medium containing an assimilable carbohydrate source and an assimilable nitrogen source in the presence of growth promoting amounts of a growth promoter selected from the group consisting of biotin and desthiobiotin until a substantial amount of L-glutamic acid is produced.

2. The process of claim 1 wherein the cultivation is effected under submerged aerobic conditions at a temperature ranging from about 33–35° C.

3. The process of claim 2 wherein the growth promoter is biotin and it is used in amounts from about 1.5 to 3.5 micrograms per liter.

4. The process of claim 3 wherein the biotin is used in amounts of from about 2–3 micrograms per liter.

5. The process of claim 2 wherein the growth promoter is desthiobiotin and is used in an amount from about 2.5–7 micrograms per liter.

6. The process of claim 5 wherein the desthiobiotin is used in an amount of from about 4–6 micrograms per liter.

References Cited by the Examiner

UNITED STATES PATENTS

| | | | |
|---|---|---|---|
| 2,978,383 | 4/1961 | Yamada | 195—47 |
| 2,978,384 | 4/1961 | Yamada | 195—47 |
| 3,002,889 | 10/1961 | Kinoshita et al. | 195—47 |
| 3,087,863 | 4/1963 | Lee et al. | 195—47 |
| 3,096,252 | 7/1963 | Motozaki et al. | 195—47 |
| 3,121,668 | 2/1964 | Hidy | 195—47 |
| 3,128,237 | 4/1964 | Motozaki et al. | 195—47 |

A. LOUIS MONACELL, *Primary Examiner.*

L. M. SHAPIRO, *Assistant Examiner.*